United States Patent [19]

Iwata et al.

[11] 4,041,512
[45] Aug. 9, 1977

[54] LIGHT CONTROL DEVICE

[75] Inventors: Hiroshi Iwata, Osaka; Katsuji Ishikawa, Daito, both of Japan

[73] Assignee: West Electric Co., Ltd., Japan

[21] Appl. No.: 550,544

[22] Filed: Feb. 18, 1975

[30] Foreign Application Priority Data

Feb. 22, 1974 Japan .................................. 49-21154
Feb. 22, 1974 Japan .................................. 49-21155

[51] Int. Cl.² .............................................. G03B 9/08
[52] U.S. Cl. ................................ 354/234; 354/23 D; 354/44
[58] Field of Search ............... 354/23 D, 60 R, 60 A, 354/234, 235, 238, 40, 38, 50, 271

[56] References Cited

U.S. PATENT DOCUMENTS

| | | | |
|---|---|---|---|
| 3,348,462 | 10/1967 | Fahlenberg | 354/234 |
| 3,654,845 | 4/1972 | Fahlenberg et al. | 354/234 |
| 3,686,672 | 8/1972 | Ishizuka | 354/238 |
| 3,687,042 | 8/1972 | Mizui et al. | 354/234 |
| 3,818,499 | 6/1974 | Brandt | 354/238 |
| 3,842,587 | 10/1974 | Strauss et al. | 354/23 D |
| 3,900,855 | 8/1975 | Stempeck | 354/38 |
| 3,903,528 | 9/1975 | Kee | 354/50 |

FOREIGN PATENT DOCUMENTS 1,330,203  5/1963  France .................................. 354/271

Primary Examiner—Russell E. Adams
Attorney, Agent, or Firm—Burgess, Ryan and Wayne

[57] ABSTRACT

The invention discloses a light control device comprising a light control mechanism comprising a plurality of shutter blades, which may also function as an aperture control diaphragm, and shutter blade driving means for intermittently driving the shutter blades in response to pulse signals; and a control circuit for applying the pulse signals to the driving means.

21 Claims, 29 Drawing Figures

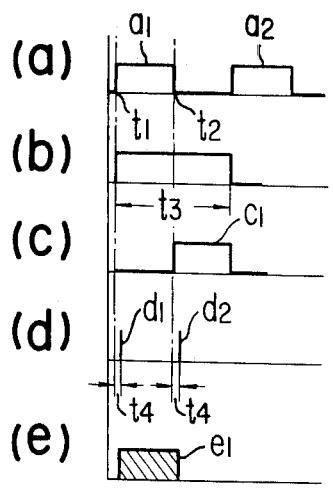
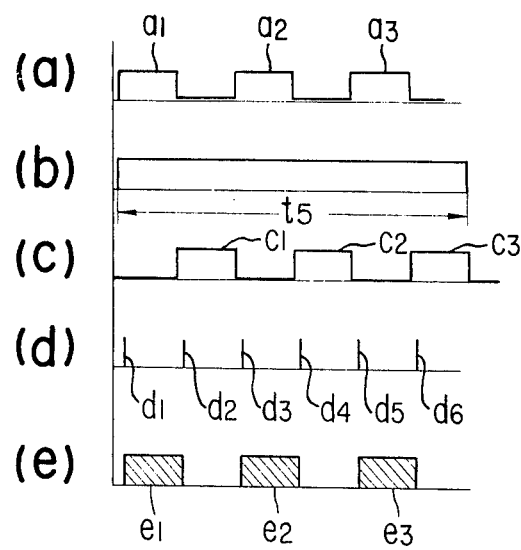
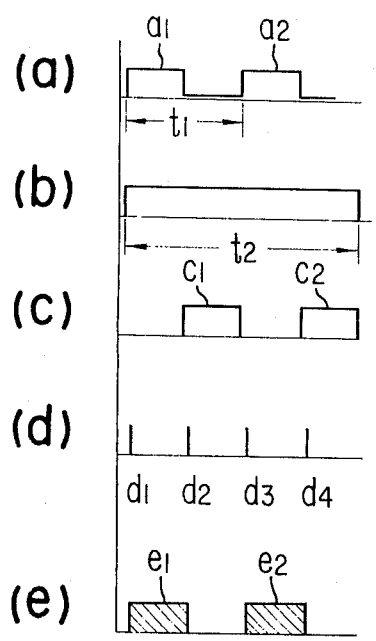
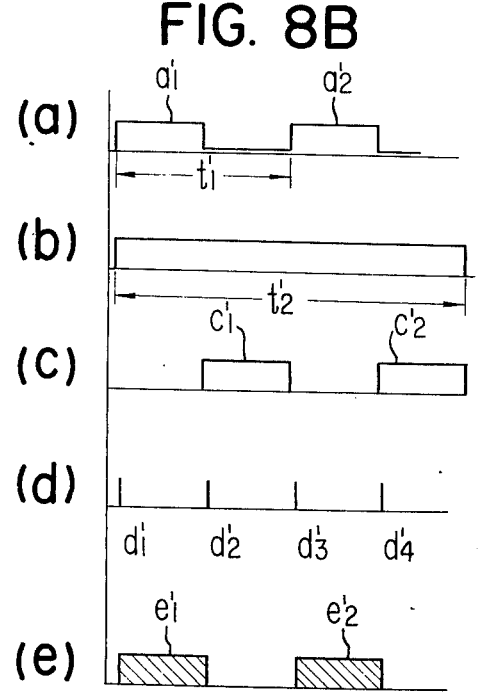

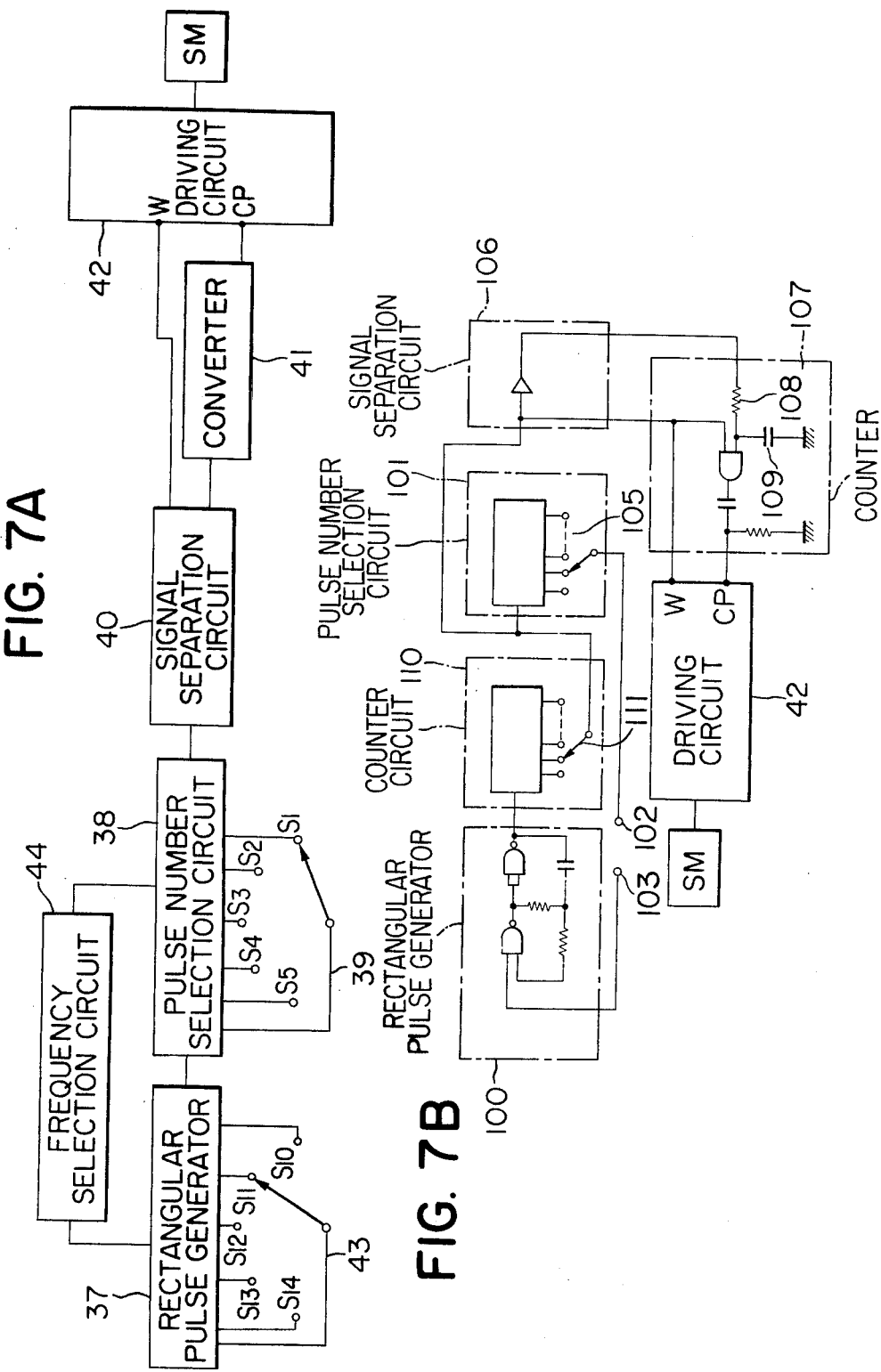

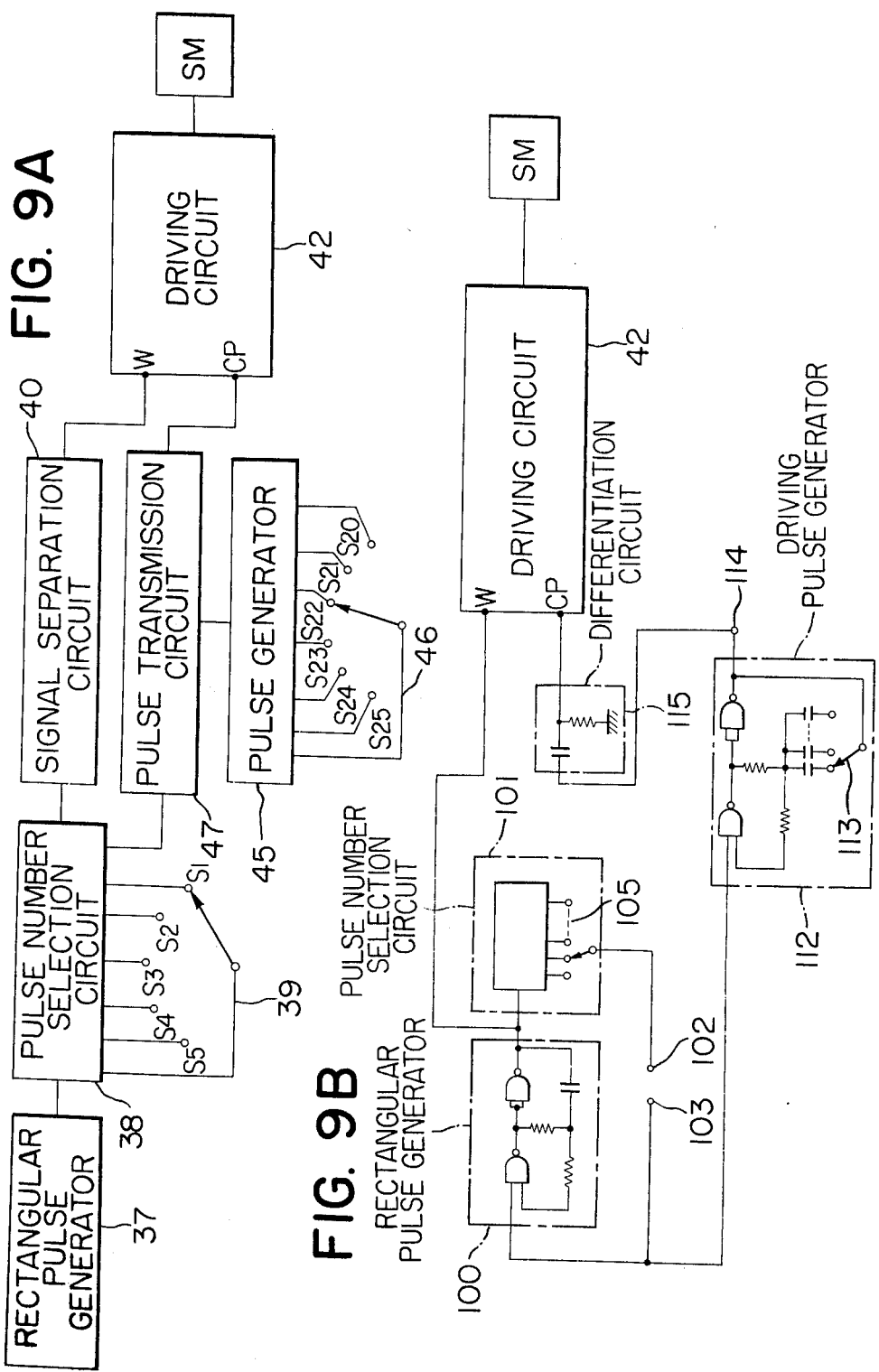

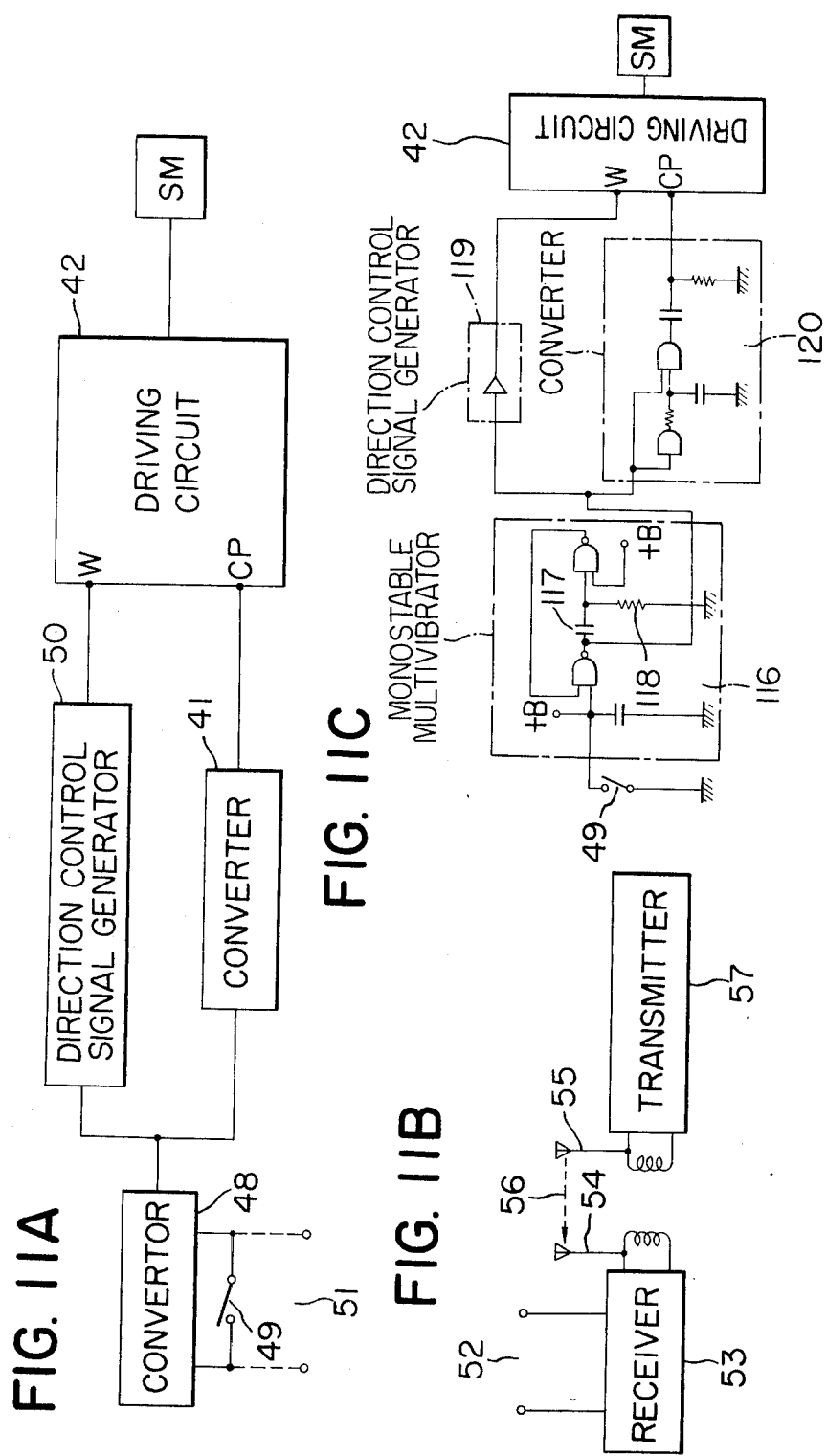

LIGHT CONTROL DEVICE

BACKGROUND OF THE INVENTION

The present invention relates to a light control device of the type comprising a light control device comprising a plurality of shutter blades, which may also function as an aperture control diaphragm, and means for driving the shutter blades intermittently in response to pulse signals to be transmitted from a control circuit.

In conventional shutter mechanisms of photo cameras, shutter blades are, in general, opened and closed by mechanical forces. For instance, when a film advance lever is operated to advance the film, the power required for actuating the shutter blades is charged and stored in the form of mechanical force. When a shutter release button is depressed, the shutter blades are opened and then closed by the stored driving power. Therefore, unless the shutter driving power is stored in a shutter spring in the form of mechanical force whenever the film advance lever is rotated, the shutter blades cannot be actuated at all. Therefore, the conventional shutter mechanisms of the type described have an inherent undesirable feature in that the shutter blades cannot be actuated many times in succession at a high speed in a relatively short time.

In order to actuate the shutter blades in response to an electrical signal in the conventional shutter mechanism, the shutter release button is mechanically coupled to a solenoid so that when the solenoid is energized in response to the electrical signal, the shutter release button is depressed to open the shutter. However, such arrangement as described above has a disadvantage that the opening of the shutter blades is not in synchronism with the electrical signal because of the time lag required for the solenoid to produce sufficient force to depress the shutter button in response to the electrical signal applied and in view of the time required for transmitting the driving force from the shutter button to the shutter driving means through the mechanical mechanism. Moreover, since the solenoid must be provided and coupled to the shutter release button through a mechanical coupling, the shutter release mechanism driven by the solenoid becomes large in size and complex in construction.

In conventional shutter mechanisms of the type described above, the power required for actuating the shutter blades cannot be applied and stored unless the film advance lever is operated, and the power must be applied and stored each time the shutter blades are opened and closed. Therefore, the continuous motion of an object cannot be photographed on the same film.

SUMMARY OF THE INVENTION

In view of the above, one of the objects of the present invention is to provide a light control device wherein a plurality of shutter blades, which also may function as the aperture control diaphragm, may be opened and closed many times in succession during a relatively very short time without the aid of the mechanical force applied and stored during the film transport.

Another object of the present invention is to provide a light control device of the type described above wherein a number of actuations of the shutter blades and a time during which the shutter blades remain opened (to be referred to as "the shutter opening time" hereinafter in this specification) may be arbitrarily selected.

A further object of the present invention is to provide a light control device of the type described wherein the shutter blade operation may be accomplished by a remote control system without a time lag with respect to the externally applied electrical signal.

A further object of the present invention is to provide a light control device of the type described wherein multiple exposures may be accomplished in a simple manner.

Briefly stated, a light control device in accordance with the present invention comprises a light control mechanism comprising a plurality of shutter blades or leaves, which may also function as the aperture control diaphragm, and means such as a stepping motor for intermittently driving the shutter blades in response to pulse signals from a control circuit. In response to direction control signals; that is, shutter blade opening and closing signals and driving pulse signals, the shutter blades are opened and closed. For this purpose, the driving means is stepped a number of times in response to the driving pulse signals in the direction indicated by the direction control signal. The shutter blades may be opened only one time or a predetermined number of times in succession. The area of the opening defined by the shutter blades to be referred to as the "shutter opening area" in this specification, may be varied by changing a number of driving pulses to be applied to the driving means during a time when the direction control signal or the opening signal is applied thereto. To close the shutter blades, the same number of driving pulses are applied to the driving means when the shutter closing signal is applied thereto.

In order to change the time during which the shutter blades remain opened, the pulse spacing of the driving pulses are changed.

According to the present invention, the shutter blade operation may be controlled in response to the electrical pulse signals so that the remote control of the light control device in accordance with the present invention may be accomplished in a very simple manner. In the remote control system, electrical, light or sound signals may be used as needs demand.

The above and other objects, features and advantages of the present invention will become more apparent from the following description of some preferred embodiments thereof taken in conjunction with the accompanying drawings.

BRIEF DESCRIPTION OF THE DRAWINGS

FIGS. 6A and 6B show the waveforms used for the explanation of the mode of the operation of the first embodiment shown in FIG. 5A;

FIG. 7A is a second embodiment of a control circuit in a light control device in accordance with the present invention;

FIG. 7B is a detailed circuit diagram thereof;

FIGS. 8A and 8B show the waveforms used for the explanation of the second embodiment shown in FIG. 7A;

FIG. 9A is a block diagram of a third embodiment of a control circuit in accordance with the present invention;

FIG. 9B is a detailed circuit diagram thereof;

FIGS. 11A and 11B are block diagrams of a fourth embodiment of a control circuit in accordance with the present invention;

FIG. 11C is a detailed circuit diagram of the control circuit shown in FIG. 11A;

FIG. 11D is a block diagram of a variation of the embodiments of the control circuit shown in FIGS. 11A and 11B.

Same reference numerals are used to designate similar parts throughout the figures.

DESCRIPTION OF THE PREFERRED EMBODIMENTS

Driving Means

Figure 1A:
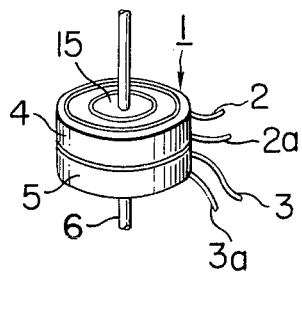
FIG. 1A is a perspective view of a stepping motor used in the present invention as means for driving a plurality of shutter blades which may also function as an aperture control diaphragm.
Figure 1B:
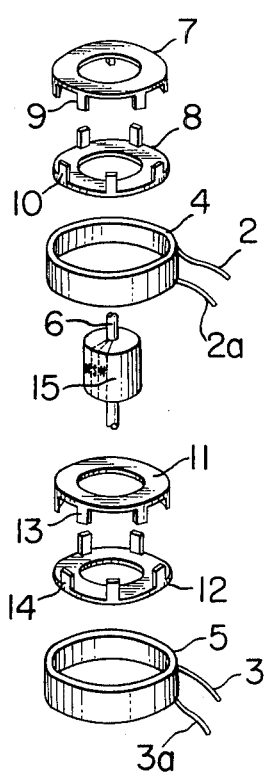
FIG. 1B is an exploded perspective view thereof.

FIG. 1A is a perspective view of a stepping motor used as shutter blade driving means in a light control device in accordance with the present invention. The stepping motor 1 generally comprises a rotor 15 with a shaft 6 and field or driving coils 4 and 5 with lead wires 2 and 2a, and 3 and 3a, respectively, which surround the rotor 15. As shown in FIG. 1B, two magnet rings 7 and 8 are assembled in such a way that they are vertically spaced apart from each other by their upwardly and downwardly directed projections 9 and 10 and that these projections 9 and 10 are equiangularly spaced apart from each other. The magnet ring assembly thus assembled is fitted into the field coil 4. In like manner, a lower magnet ring assembly consisting of two magnet rings 11 and 12 assembled in a manner substantially similar to that described above, is fitted into the lower field coil 5. Thereafter, the upper and lower field coils 4 and 5 are assembled as shown in FIG. 1A.

The rotor 15, which is fitted into the field coil assembly, has at its side surface permanent magnetic poles N and S disposed equiangularly and alternately, the number of these poles N and S being one half of the total number of the projections 9, 10, 13 and 14 of the magnetic rings 7, 8, 11 and 12.

Figure 2A:
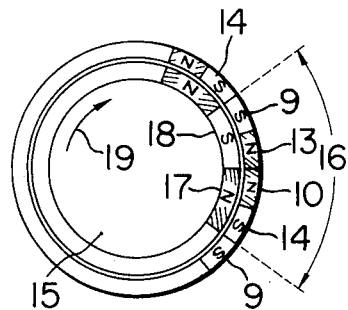
FIGS. 2A, 2B and 2C are diagrams used for the explanation of the mode of operation of the stepping motor.
Figure 2B:
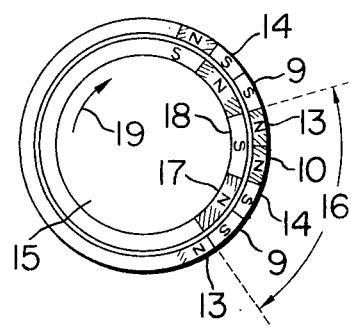
Figure 2C:
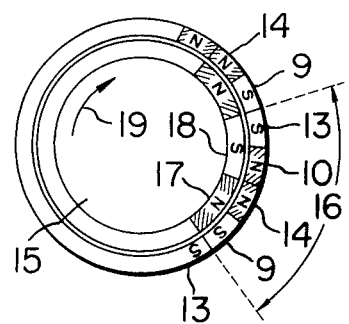

Next referring to FIGS. 2A, 2B and 2C, the mode of operation of the stepping motor 1 with the above construction will be described. The field coils 4 and 5, which are connected through their lead wires 2, 2a, 3 and 3a to a power supply (not shown), are so energized that the projections 9, 10, 13 and 14 of the magnetic rings 7, 8, 11 and 12 may have the magnetic polarities as shown in FIG. 2A. Then, the N-pole 17 of the rotor 15 in a section indicated by broken lines 16 is repelled from the projection or N-pole 10, but is attracted toward the projection 14. In like manner, the S-pole 18 of the rotor 15 is repelled from the projection or S-pole 9, but is attracted toward the projection or N-pole 13. As a result, the rotor 15 is rotated in the clockwise direction as indicated by the arrow 19, and is stopped at the position shown in FIG. 2B where the magnetic balance between the rotor 15 and the field coils 4 and 5 is reached.

Next the field coil 5 is energized in the reverse direction so that the polarities of the projection 13 of the magnetic ring 11 and the projection 14 of the magnetic ring 12 are reversed. As a result, the rotor 15 is rotated further in the clockwise direction and is stopped at the position at which the magnetic balance between the rotor 15 and the field coils 4 and 5 is attained. Thus, by reversing the direction of the current flowing through the field coils 4 and 5, the rotor 15 may be rotated stepwise through a discrete angle.

As shown in FIG. 3, a light control mechanism of the light control device in accordance with the present invention comprises, in general, a pair of shutter blades 20 and 21 whose one ends are pivoted with a common pivot pin 22 to a camera body. The other end of each shutter blade 20 or 21 terminates into a semicircular end portion provided with an arcuate slot 25 or 26 into which is slidably fitted a driving pin 23 or 24 extending from the stepping motor 1. The shutter blades 20 and 21 are provided with V-shaped cutout portions 28 and 29 which cooperate with each other so as to define an opening 27 as will be described in detail hereinafter.

Figure 3A:
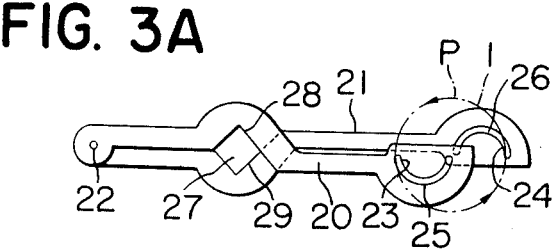
FIGS. 3A and 3B are top views of a first embodiment of a light control mechanism in accordance with the present invention comprising a pair of shutter blades and the stepping motor shown in FIG. 1.
Figure 3B:
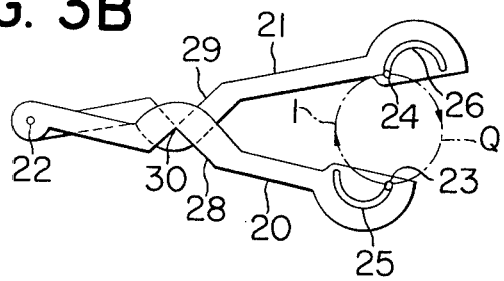

When the stepping motor 1 is rotated intermittently in the direction indicated by the arrow P, the driving pins 23 and 24 thereof are also displaced intermittently within the arcuate slots 25 and 26, respectively, so that the opening 27, which is shown as being wide opened in FIG. 3A, is closed as indicated at 30 in FIG. 3B. To form the opening, the stepping motor 1 is reversed in direction indicated by the arrow $Q_1$ and the degree of the opening 27 may be suitably determined by changing the curvature of the arcuate slots 25 and 26.

Figure 4A:
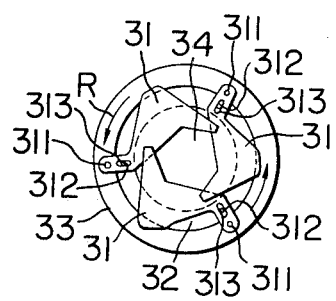
FIGS. 4A, 4B and 4C are a top view, an exploded view, and a perspective view, respectively of a second embodiment of a light control mechanism in accordance with the present invention comprising three shutter blades.
Figure 4B:
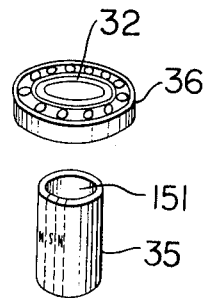
Figure 4C:
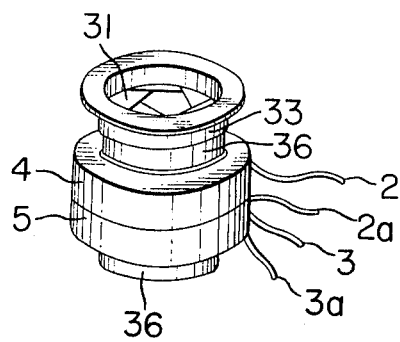

FIGS. 4A–4C show the second embodiment of a light control mechanism in accordance with the present invention comprising, in general, three shutter blades 31 and a stepping motor. As shown in FIG. 4A, each shutter blade 31 has one end pivoted at 312 to a stationary ring 33 in such a way that when a rotary ring 32 is rotated in the direction indicated by the arrow R the opening 34 defined by the three shutter blades 31 may be reduced in area. The stepping motor used in the second embodiment is substantially similar in construction to the stepping motor 1 described hereinbefore except that a hollow rotor 35 is used. Both ends of the rotor 35 are journalled by antifriction bearings 36, and the rotary ring 33 is attached to the upper bearing 36 as shown in FIG. 4C.

Referring back to FIG. 4A, each shutter blade 31 is pivoted with a pivot pin 311 to the rotary ring, and has an elongated slot 313 into which is fitted a pin (not shown) extending from the rotary ring 32.

According to the second embodiment, the opening 34 is defined by the shutter blades 31 in coaxial relation with the rotor 35 of the stepping motor 1, so that there is an advantage that the light control mechanism may be made compact in size.

Figure 5A:
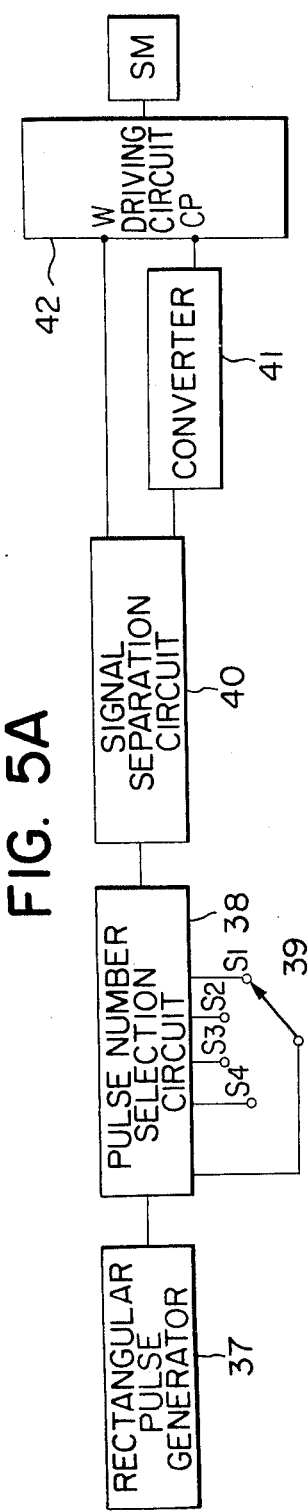
FIG. 5A is a block diagram of a first embodiment of a control circuit in a light control device in accordance with the present invention.

FIG. 5A is a block diagram of the first embodiment of a control circuit in the light control device in accordance with the present invention. The control circuit is for actuating the shutter blades in the light control mechanism a predetermined number of times within a relatively short time as will be described in detail with reference to FIGS. 6A and 6B. FIG. 6A shows the waveforms at various points in the control circuit when the shutter blades are actuated one time; that is, the shutter opening is opened and then closed. FIG. 6B shows the waveforms when the shutter blades are actuated three times; that is, when the shutter is opened three times.

Referring to FIGS. 5A and 6A, a pulse generator 37 generates continuously the rectangular pulses as shown at (a) in FIG. 6A. A pulse number selection circuit 38 has a selection switch 39 for selecting a desired number of shutter openings so that a predetermined number of pulses $a_1, a_2, \ldots$ from the rectangular pulse generator 37 may be transmitted to a signal separation circuit 40 in the next stage. When it is desired to open the shutter one time; that is, to actuate the shutter blades one time, the stationary contact $s_1$ of the selection switch 39 is closed. When a start button (not shown) is depressed, the pulse number selection circuit 38 is actuated for a time period $t_3$ shown at (b) in FIG. 6A so that only one pulse $a_1$ is transmitted from the pulse generator 37 to the signal separation circuit 40.

The signal separation circuit 40 has a dual function. One function is to transmit the pulse $a_1$ to a converter 41 which converts the received pulse $a_1$ into the driving pulses for driving the stepping motor SM. The other function is to generate the direction control signal to be applied to a driving circuit 42. The direction of rotation of the stepping motor SM is determined in response to the direction control signal.

The converter 41 generates a driving pulse $d_1$ which is delayed by $t_4$ from the leading edge of the pulse $a_1$ and the driving pulse $d_2$ which is delayed by $t_4$ from the trailing edge of the pulse $a_1$ as shown at (d) in FIG. 6A. The driving pulses $d_1$ and $d_2$ are transmitted to the input terminal CP of the driving circuit 42.

The closing signal $c_1$ generated by the separation circuit 40 and applied to the input terminal W of the driving circuit 42, has its leading edge generated in synchronism with the trailing edge of the $t_2$ as shown at (c) in FIG. 6A, so that the stepping motor is reversed in rotation to close the shutter. Until the time $t_2$; that is, until the closing signal $c_1$ is generated, the stepping motor SM is rotated in the direction for opening the shutter.

Figure 5B:
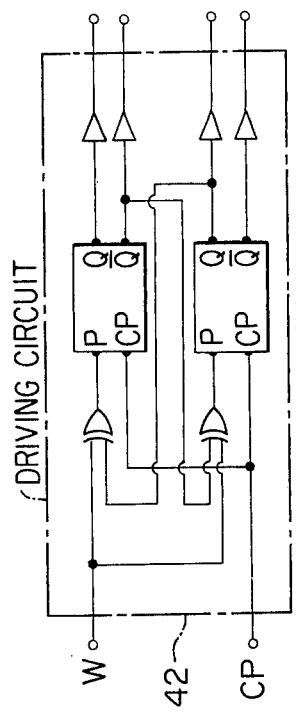
FIG. 5B is a detailed block diagram of a motor drive circuit thereof.

The stepping motor drive control circuit controls the shutter blade actuating means in response to the driving pulse signals $d_1$ and $d_2$ and the closing signal $c_1$. As shown in FIG. 5B, the control circuit comprises a plurality of flip-flops for reversing the direction of the current flowing through the field or driving coils of the stepping motor, and a plurality of gates for controlling the flip-flops. The motor driving circuit 42 of the type described is well known to those skilled in the art so that no more description shall be made in this specification.

In response to the driving signal $d_1$, the stepping motor SM is rotated in the direction for opening the shutter blades while in response to the driving signal $d_2$, it reverses its rotation so that the shutter blades are closed. Therefore, the shutter is opened as indicated $e_1$ in FIG. 6A (e).

Next referring to FIGS. 5A and 6B, the mode of operation for opening the shutter three times in succession will be described hereinafter. First the stationary contact $S_3$ of the selection switch 39 is closed, and then the starter switch (not shown) is depressed. The selection circuit 38 is actuated for a time $t_5$ as shown at (b) in FIG. 6B so that three pulses $a_1$, $a_2$ and $a_3$ from the pulse generator 37 are transmitted to the separation circuit 40. The separation circuit 40 transmits the three pulses $a_1$, $a_2$ and $a_3$ to the converter 41, and generates three closing signals $c_1$, $c_2$ and $c_3$ to be applied to the terminal W of the motor driving circuit 42.

In response to the pulses $a_1$, $a_2$ and $a_3$, the converter 41 generates six driving pulses $d_1$–$d_6$ in a manner substantially similar to that described elsewhere. The driving signals $d_1$–$d_6$ are applied to the terminal CP of the motor driving circuit 42. In response to the driving pulses $d_1$–$d_6$ and to the closing pulses $c_1$–$c_3$, the motor driving circuit 42 drives the stepping motor SM so that the shutter is opened and closed three times in succession as indicated at $e_1$, $e_2$ and $e_3$ in FIG. 6B(e) in a manner substantially similar to that described hereinbefore.

Next referring to FIG. 5C, the first embodiment of the control circuit shown in block diagram in FIG. 5A will be described in more detail hereinafter. The pulse generator 37 or 100 in FIG. 5C comprises a plurality of NAND gates, and the pulse selection circuit 38 or 101 in FIG. 5C comprises a conventional counter so arranged that the output signal in response to the frequency division ratio may be derived at an output terminal 102. The output signal is applied to the terminal 103 of the pulse generator 100 to stop the same so that the number of pulses transmitted from the pulse generator 100 to the separation circuit may be controlled. More particularly the frequency division ratio may be changed by the selection switch 105 so that the number of pulses transmitted from the pulse generator 100 to a terminal 104 may be controlled. The pulses are transmitted from the input terminal 104 to the signal separation circuit 40 or 106 in FIG. 5C which comprises an AND gate.

Figure 5C:
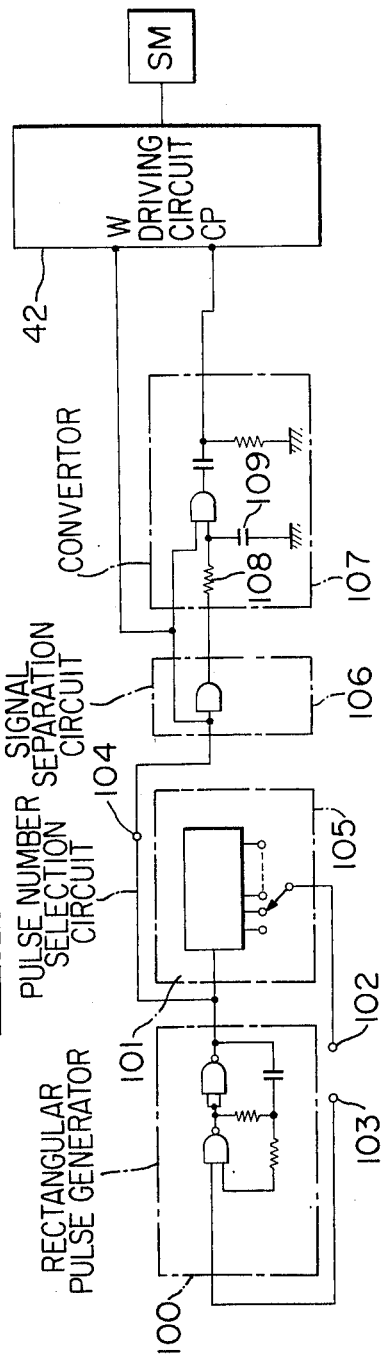
FIG. 5C is a detailed circuit diagram of the control circuit shown in FIG. 5A.

One of the output signals from the signal separation circuit 40 is applied to the terminal W of the motor drive control circuit 42 while the other output, to the input terminal CP after being delayed for a predetermined time by a delay circuit in the converter 41 or 107 in FIG. 5C comprising a resistor 108 and a capacitor 109. In response to the input signals applied to the terminals W and CP, the motor driving circuit 42 drives the stepping motor SM in the manner described elsewhere. The control circuit shown in FIG. 5C is only one example of the present invention, and it is to be understood that various modifications may be effected within the scope of the present invention.

Second Embodiment

Next referring to FIGS. 7A and 7B, the second embodiment of the present invention capable of not only actuating the shutter blades but also suitably controlling the shutter opening time, will be described hereinafter. For the purpose of controlling the shutter opening time, a selection switch 43 is connected to the pulse generator 37 so that the pulse spacing of the pulses generated thereby may be suitably selected. A frequency selection circuit 44 is also connected to the pulse generator and to the selection circuit 38 in order to change the actuation or "ON" time interval of the latter in response to the pulse spacing of the pulses from the pulse generator 37.

Next the mode of operation for opening the shutter two times in succession will be described hereinafter with further reference to FIGS. 8A and 8B. When the contact $S_{11}$ of the selection switch 43 is closed, the pulse spacing of the pulses $a_1, a_2, \ldots$ from the pulse generator 37 is $t_1$, and the actuation or ON time of the selection circuit 38 is $t_2$, the shutter is opened twice as indicated at $e_1$ and $e_2$ in FIG. 8A(e) in a manner substantially similar to that described hereinbefore. If it is desired to increase the shutter opening time $e_1$ and $e_2$, the stationary contact $S_{12}$ of the selection switch 43 is closed. Then the spacing $t_1$ between the pulses $a_1'$ and $a_2'$ becomes longer than the pulse spacing $t_1$ as shown in FIG. 8B(a), so that the actuation or ON time control circuit 44 increases the actuation or ON time of the selection circuit 38 to $t_2'$ as shown in FIG. 8B(b). Therefore, the shutter opening time $e_1'$ and $e_2'$ may be increased as shown in FIG. 8B(e) in a manner substantially similar to that described elsewhere.

The detail of the control circuit of the second embodiment shown in FIG. 7B is substantially similar to that shown in FIG. 5C except that a counter circuit 110 is interconnected between the pulse generator 100 and the selection circuit 101. The counter circuit 110 accomplishes the frequency division of the pulses from the pulse generator 100, and its outputs may be selected by a selection switch 111 to be applied to the pulse generator 100 so that the pulse spacing may be suitably changed. The counter circuit 110 corresponds to the actuation or ON time control circuit 44 in FIG. 7A while the switch 111, to the selection switch 43.

Third Embodiment

Figure 10:
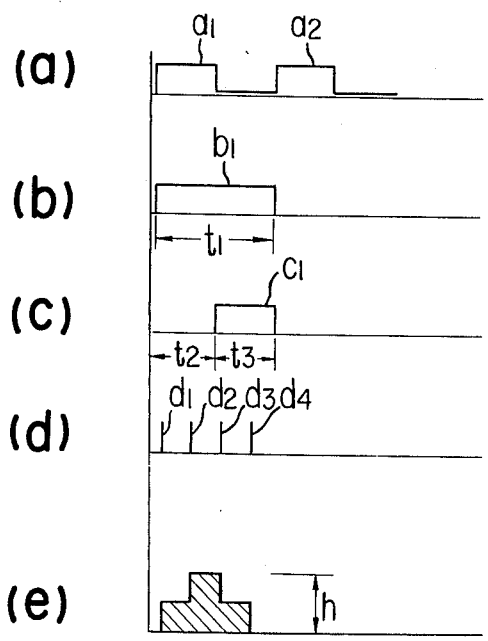
FIG. 10 shows the waveforms used for the explanation of the mode of operation of the third embodiment shown in FIG. 9A.

Next referring to FIGS. 9A and 10, the third embodiment of the present invention capable of controlling the opening area or aperture stop will be described. In the third embodiment, a driving pulse generator 46 is connected through a driving pulse transmitting circuit 47 to the input terminal CP of the driving circuit 42. The oscillation frequency of the pulse generator 45 may be varied by a selection switch 46, so that the driving pulses $d_1, d_2, \ldots$ may be derived as shown in FIG. 10(d). The driving pulse transmission circuit 47 permits the transmission of the driving pulses $d_1, d_2, \ldots$ from the pulse generator 45 to the input terminal CP of the motor driving circuit CP only during the pulse duration $t_1$ of the output pulse $b_1$ from the pulse number selection circuit 38 as shown in FIG. 10(b).

FIG. 10 shows the waveforms at various points of the control circuit shown in FIG. 9A when the shutter is opened one time, but the shutter opening area is made twice as much as the area obtained by the first embodiment (See FIG. 6A). In order to open the shutter one time, the stationary contact $S_1$ of the selection switch 39 is closed, and the stationary contact $S_{22}$ of the selection switch 46 is closed so that the shutter opening area may be increased by two times. Thereafter, the start switch (not shown) is depressed. Only one pulse $a_1$ from the pulse generator 37 is transmitted through the selection circuit 38 to the separation circuit 40 in a manner substantially similar to that described elsewhere with reference to FIG. 6A. In response to the trailing edge of the pulse $a_1$, the separation circuit 40 generates the closing signal $c_1$ as shown in FIG. 10(c). The closing signal is applied to the input terminal W of the motor driving circuit 42.

During the time $t_1$ when the transmission circuit 38 is on, four driving pulses $d_1, d_2, d_3$ and $d_4$ (See FIG. 10(d)) are transmitted through the driving pulse transmission circuit 47 to the input terminal CP of the motor driving circuit 42. During the time when the closing signal $c_1$ is not applied to the input terminal w of the driving circuit 42, the driving pulses $d_1$ and $d_2$ causes the stepping motor SM to rotate in two steps in the same direction, and during the time when the closing pulse $c_1$ is applied to the input terminal w, the driving pulses $d_3$ and $d_4$ cause the stepping motor SM to rotate in two steps in the reverse direction. As a result, the shutter blades are opened twice as large as the shutter blades described with reference to FIG. 6A.

The control circuit shown in block diagram shown in FIG. 9A is shown in detail in FIG. 9B. The driving pulse generator 45 or 112 in FIG. 9B comprises NAND gates, and the oscillation frequency may be changed by a selection switch 113. The driving pulses are transmitted from an output terminal 114 to the input terminal CP of the motor driving circuit 42 through a differentiation circuit 115. The driving pulse generator 112 must generate the drive pulses $d_1, d_2, \ldots$ of a frequency higher than that of the rectangular pulses derived from the pulse generator 100, and the frequency selected by the switch 113 must be an integral multiple of the oscillation frequency of the pulse generator 100.

Fourth embodiment

Figure 12A:
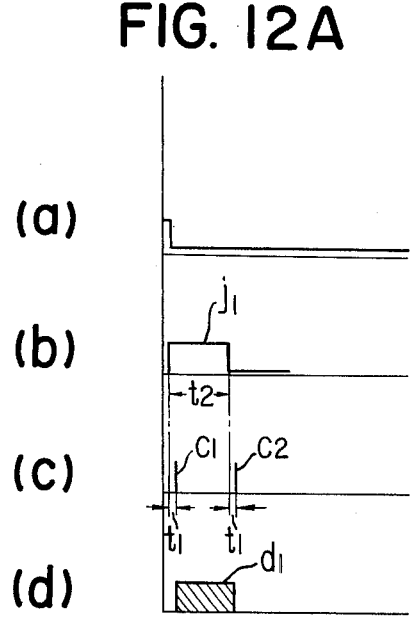
FIGS. 12A and 12B show the waveforms used for the explanation of the mode of operation of the fourth embodiment shown in FIGS. 11A and 11B.
Figure 12B:
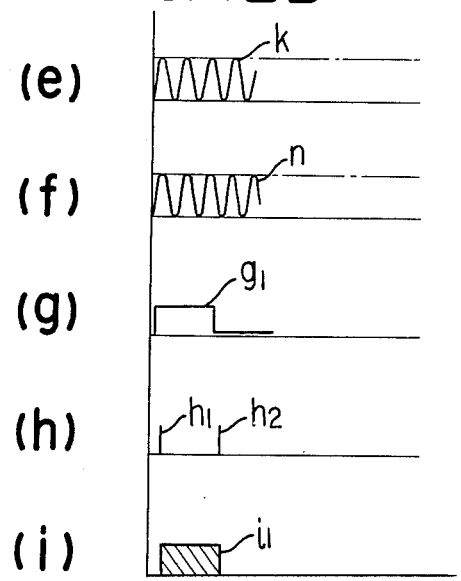

Next referring to FIGS. 11A, 11B, 11C, 12A and 12B, the fourth embodiment of the present invention of the type of controlling the light control mechanism in response to the external signal will be described hereinafter. When a switch 49 is closed, the signal shown at (a) in FIG. 12A is applied to an external signal converter 48 so that it generates the rectangular single-shot pulse $j_1$ (FIG. 12A(b)), which is applied to the pulse converter 41 and to a direction control signal generator 50. The converter 41 generates the driving pulses $c_1$ and $i_2$, which are delayed by a very short time $t_1$ from the leading and trailing edges, respectively, of the output pulse $j_1$ and are applied to the input terminal CP of the motor driving circuit 42. In response to the output signal $j_1$ from the converter 48, the direction control signal generator 50 generates the forward rotation signal which continues as long as the output pulse $j_1$ is applied thereto, and then generates the reverse rotation signal when the input pulse $j_1$ disappears. The forward and reverse rotation signals are applied to the input terminal W of the motor driving circuit 42. Therefore, in response to the input signals $c_1, c_2$ and $j_1$, the motor driving circuit 42 causes the stepping motor SM to rotate in a manner substantially similar to that described hereinbefore so that the shutter is opened as indicated at $d_1$ in FIG. 12A(d).

The fourth embodiment further includes a receiver 53, 53A whose output terminals 52 are connected to the terminals 51 of the switch 49. When the antenna 54 of the receiver 53 or 53A intercepts the signal $k$ (See FIG. 12B(e)) transmitted from an antenna 55 of a transmitter 57 and the sound waves transmitted by the loud speaker of 57A, the receiver 53, 53A transmits to the external signal converter 48 the signal $n$ shown at (f) in FIG. 12(B). Signals $g_1, h_1$ and $h_2$ shown at (g) and (h) in FIG.

12B are generated in a manner such as described in FIG. 12A. Therefore the step motor SM is driven in a manner substantially similar to that described above so that the shutter is opened as indicated at $i_1$ in FIG. 12B(i).

The control circuit shown in block diagram in FIG. 11A is shown in detail in FIG. 11C. The external signal converter 48 comprises, for instance, a monostable multivibrator 116. When the switch 49 is closed, one shot pulse with the pulse duration dependent upon the values of a capacitor 117 and a resistor 118 is transmitted through the direction control signal generator 119 consisting of, for instance, a buffer circuit 119 to the input terminal W of the motor driving circuit 42. The output pulse is also transmitted to the converter 41 or 120 in FIG. 11C comprising AND gates, and is converted into the driving pulse signals to be applied to the input terminal CP of the motor driving circuit 42. The receiver 53 and the transmitter 57 may be of any suitable conventional type. In the fourth embodiment, the signal $k$ is transmitted by the electromagnetic waves, but it is to be understood that the signal may be transmitted from the transmitter 57 to the receiver 53 by the sound or light beam.

Fifth Embodiment

Figure 13:
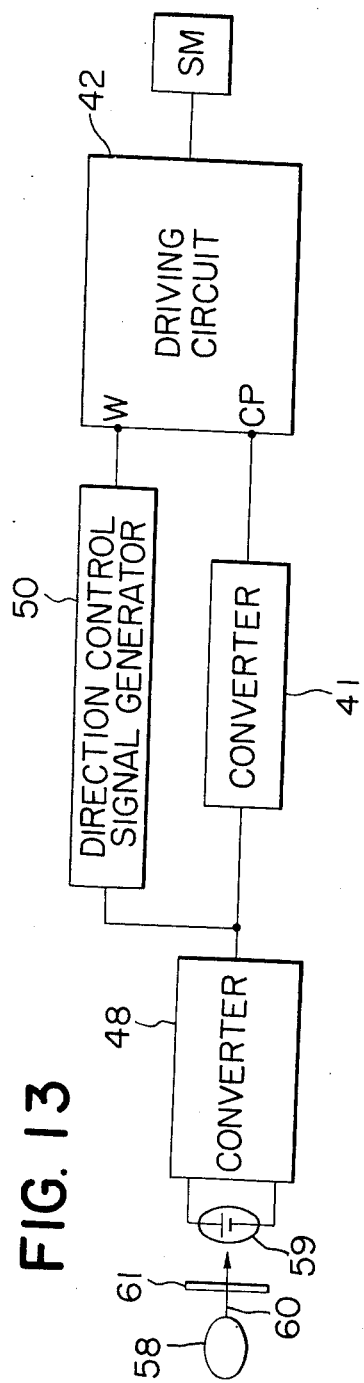
FIG. 13 is a block diagram of a fifth embodiment of a control circuit in accordance with the present invention.
Figure 14:
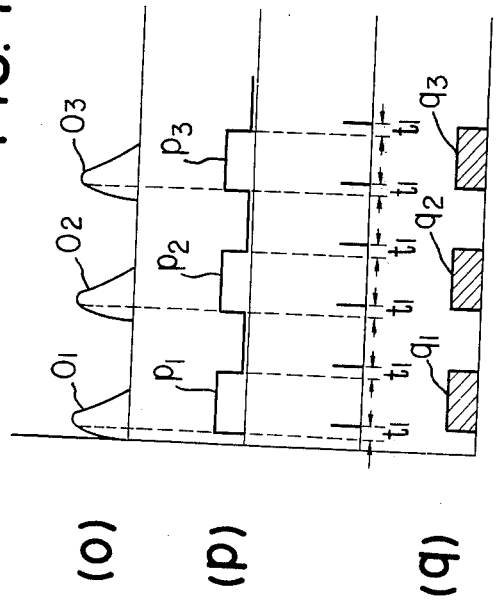
FIG. 14 shows the waveforms used for the explanation of the mode of operation thereof.

Next referring to FIGS. 13 and 14, the fifth embodiment of the present invention will be described. In the fifth embodiment, the shutter is opened in response to the external signals transmitted in succession within a predetermined time. The fifth embodiment is substantially similar in construction to the fourth embodiment except that instead of the selection switch 49 shown in FIG. 11A, a photocell 59 is used.

A shutter means 61 is interposed between a light source 58 such as an incandescent lamp or gas discharge lamp and a photoelectric cell 59, which may be either of the photovoltaic type or the photoconductive type such as a CdS element. When the shutter 61 intermittently closes the light path 60 between the light source 58 and the photocell 59, the light signals $O_1$, $O_2$ and $O_3$ shown at (O) in FIG. 14 fall upon the photocell 59 in succession. In response to the output signals from the photocell 59, the external signal converter 48 is actuated to generate the pulse output signals $p_1$, $p_2$ and $p_3$ as indicated at (p) in FIG. 14. In response to the output pulses $p_1$, $p_2$ and $p_3$, the converter 41, the rotation direction control signal generator 50, and the motor driving circuit 42 are actuated in the manner described in the fourth embodiment so that the shutter is opened three times as indicated at $q_1$, $q_2$ and $q_3$ in FIG. 14.

The embodiments of the present invention are advantageous in that when it is desired to observe the continuous motion of an object, the motions may be photographed at a suitable time interval.

What is claimed is:

1. A light control device comprising:
  A. a light control mechanism comprising
    a. shutter blade means drivable to a plurality of positions for defining at each position a different aperture, and
    b. shutter blade driving means connected to said shutter blade means for driving said shutter blade means to successive positions in response to each pulse of a first pulsatory signal and for controlling the direction of driving said shutter blade means in response to each pulse of a second pulsatory signal,
  B. a control circuit for providing said pulsatory signals comprising,
    a. a rectangular pulse generator for generating driving pulse signals and having an output terminal,
    b. circuit means connected to said pulse generator for selectably controlling the number of pulses applied to said output terminal of said pulse generator,
    c. circuit means responsive to said pulses at said output terminal for producing said first pulsatory signal, and
    d. circuit means continuously responsive to said pulses at said output terminal for producing said second pulsatory signal, whereby said second pulsatory signal may occur a plurality of times for a selected number of pulses at said output terminal.

2. A light control device as set forth in claim 1 wherein
said pulse generator includes means for selectively changing the pulse spacing of the pulses generated by said generator.

3. A light control device as recited in claim 1, wherein said rectangular pulse generator comprises
  A. signal transmission means comprising
    a. signal transmitter means for transmitting remote control signals, and
    b. signal receiver means located at a remote place from said transmitter means for receiving said remote control signals, and
  B. signal converter means for generating electrical pulse signals of rectangular waveform in response to the remote control signals received by said receiver means.

4. A light control device as set forth in claim 3 wherein said transmitter means comprises means for transmitting the control signal by electromagnetic waves.

5. A light control device as set forth in claim 3 wherein said transmitter means comprises means for transmitting the control signal a light beam.

6. A light control device as set forth in claim 3 wherein said transmitter means comprises means for transmitting the control signal by sound.

7. A light control device as set forth in claim 1, wherein said circuit means for selectively controlling the number of pulses applied to said output terminal comprises means for manually setting the number of pulses generated by said pulse generator.

8. A light control device as set forth in claim 7 wherein
said pulse generator includes means for selectively changing the pulse spacing of the pulses generated by said generator.

9. A light control device as set forth in claim 8 further comprising a circuit for controlling the on time of said means for selectively controlling the number of pulses in response to the pulse spacing of the pulses generated by said pulse generator.

10. The light control device of claim 1 wherein said circuit means responsive to pulses at said output terminal for producing said first pulsatory signal comprises a driving pulse generator having a repetition rate that is a multiple of the repetition rate of said rectangular pulse generator, whereby driving pulses for said shutter blade driving means have a repetition rate that is multiple of the pulses at said output terminal.

11. The light control mechanism of claim 10 wherein said circuit means responsive to said pulses at said output terminal comprises means applying said pulses at said output terminal to said shutter blade driving means for reversing the drive direction of said shutter blade driving means at the repetition rate of the pulses at said output terminal.

12. The light control device of claim 10 wherein said driving pulse generator has a manually adjustable pulse repetition rate.

13. The light control mechanism of claim 1 wherein said circuit means for producing said first pulsatory signal comprises delay means, whereby signal transitions of said first pulsatory signal are separated from signal transistions of said second pulsatory signal.

14. A light control device comprising a light control mechanism, said light control mechanism comprising shutter blade means for defining an aperture, and stepping motor means connected to drive said shutter blade means; and a control circuit for said stepping motor means, said control circuit comprising a pulse generator for generating drive pulse signals, a pulse number selection circuit connected to apply a predetermined number of said pulse signals from said pulse generator to said stepping motor means for stepping said stepping motor means, and a direction control circuit connected to said stepping motor means for controlling said stepping motor means to step in one direction at least once and to subsequently step in the opposite direction, said direction control circuit being connected to be continuously responsive to pulse signals received from said pulse number selection circuit whereby the number of reversals of said stepping motor means in any cycle of a predetermined number of pulse signals is dependent upon said predetermined number; said shutter blade means comprising a pair of pivotally mounted shutter blades pivoted at a common axis, each said blade having an arcuate surface, said arcuate surfaces comprising arcuate slots in respective ends of said shutter blades away from said common axis, a separate drive means coupled from said stepping motor means to each of said surfaces, said separate drive means comprising separate pins extending into said slots and coupled to be driven by said stepping motor means, whereby said shutter blades pivot in opposite relative directions about their pivotal axes in response to stepping of said stepping motor means, said shutter blades each having a notch between said common axis and the arcuate slot thereof positioned to define an opening between said blades at one angular displacement of said stepping motor means, said blades blocking said opening at another angular displacement on said stepping motor means.

15. A light control device comprising a light control mechanism, said light control mechanism comprising shutter blade means for defining an aperture, and stepping motor means connected to drive said shutter blade means; and a control circuit for said stepping motor means, said control circuit comprising a pulse generator for generating drive pulse signals, a pulse number selection circuit connected to apply a predetermined number of said pulse signals from said pulse generator to said stepping motor means for stepping said stepping motor means, and a direction control circuit connected to said stepping motor means for controlling said stepping motor means to step in one direction at least once and to subsequently step in the opposite direction, said direction control circuit being connected to be continuously responsive to pulse signals received from said pulse number selection circuit so that said stepping motor means may undergo a plurality of reversals in any cycle of a predetermined number of pulse signals, dependent upon said predetermined number; said shutter blade means comprises a pair of pivotally mounted shutter blades, each said blade having an arcuate surface, a separate drive means coupled from said stepping motor means to each of said surfaces whereby said shutter blades pivot in opposite relative directions about their pivotal axes in response to stepping of said stepping motor means, said shutter blades each having a cutout positioned to define an opening between said blades at one angular displacement of said stepping motor means; said blades blocking said opening at another angular displacement on said stepping motor means.

16. The light control device of claim 15 wherein said shutter blades are pivoted at a common axis.

17. The light control device of claim 16 wherein said arcuate surfaces comprise arcuate slots in respective ends of said shutter blades away from said common axis, said separate drive means comprising separate pins extending into said slots are coupled to be driven by said stepping motor means.

18. A light control device comprising a light control mechanism, said light control mechanism comprising shutter blade means for defining an aperture, and stepping motor means connected to drive said shutter blade means; and a control circuit for said stepping motor means, said control circuit comprising a pulse generator for generating drive pulse signals, a pulse number selection circuit connected to apply a predetermined number of said pulse signals from said pulse generator to said stepping motor means for stepping said stepping motor means, and a direction control circuit connected to said stepping motor means for controlling said stepping motor means to step in one direction at least once and to subsequently step in the opposite direction, said direction control circuit being connected to be continuously responsive to pulse signals received from said pulse number selection circuit so that said stepping motor means may undergo a plurality of reversals in any cycle of said predetermined number of pulse signals, dependent upon said predetermined member, said shutter blade means comprising a stationary ring, a rotatable ring coaxial with said stationary ring, a plurality of shutter blades extending normal to said rings, and being pivotally coupled to one of said rings, means coupled to the other of said rings for rotating each of said blades about its pivotal axis whereby said blades define an aperture coaxial with said rings, said aperture being closed in one relative angular displacement of said rotatable ring, and means coupling said stepping motor means to rotate said rotatable ring.

19. The light control device of claim 18 wherein said shutter blades are pivoted to said stationary ring, said rotatable ring is rotatable within said stationary ring, each of said shutter blades having a slot, and pin means on said rotatable ring extending into separate said slots for rotating the respective shutter blades.

20. The light control device of claim 19 wherein said stepping motor has a rotor with an axially extending hole, said rotor being mounted coaxially with said rotatable ring and coupled to drive said rotatable ring, whereby the opening defined by said shutter blades is coaxial with said rotor.

21. The light control device of claim 18 wherein said stepping motor means has a central rotor with a hole extending axially therethrough, said rotor being mounted coaxially with said rotatable ring and coupled to drive said rotatable ring, whereby said opening defined by said shutter blades is coaxial with said rotor.

* * * * *

UNITED STATES PATENT OFFICE
CERTIFICATE OF CORRECTION

Patent No. 4,041,512  Dated August 9, 1977

Inventor(s) Hiroshi Iwata, et al

It is certified that error appears in the above-identified patent and that said Letters Patent are hereby corrected as shown below:

Column 8, line 43: "$i_2$" should be --$c_2$--.

Column 8, line 65: "and" should be --or--.

Column 10, line 42: After "signal" insert --by--.

Column 10, line 57: "on" should be -- "on" --.

Column 10, line 67: Before "multiple" insert --a--.

Column 12, line 3: "comprises" should be --comprising--.

Column 12, line 11: " ; " should be -- , --.

Column 12, line 20: "are" should be --and--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks